United States Patent [19]

Kiernan et al.

[11] Patent Number: 5,263,608

[45] Date of Patent: Nov. 23, 1993

[54] METHOD AND APPARATUS FOR DISPENSING A CONSTANT CONTROLLED VOLUME OF ADHESIVE

[75] Inventors: Bernard C. Kiernan; Bernard A. Semp; Dennis M. Driscoll; David L. Bilunas, all of Richmond, Va.

[73] Assignee: Philip Morris Incorporated, New York, N.Y.

[21] Appl. No.: 710,324

[22] Filed: Jun. 4, 1991

[51] Int. Cl.5 .......................... B67D 5/08; B67D 5/14
[52] U.S. Cl. ........................................ 222/1; 222/52; 222/504; 118/688; 118/710
[58] Field of Search ................... 222/52, 55, 504, 1, 222/59; 118/688, 694, 696, 704, 300, 323, 710; 427/8, 421

[56] References Cited

U.S. PATENT DOCUMENTS

| | | | |
|---|---|---|---|
| 2,594,618 | 4/1952 | Booth, Jr. | 73/204 |
| 2,813,237 | 11/1957 | Fluegel et al. | 318/29 |
| 2,914,253 | 11/1959 | Jobus et al. | 239/75 |
| 3,651,989 | 3/1972 | Westrich | 222/14 |
| 3,706,398 | 12/1972 | Kato et al. | 222/59 X |
| 3,827,603 | 8/1974 | Reighard et al. | 222/146 HE |
| 4,029,094 | 6/1977 | Winicki | 222/55 X |
| 4,246,969 | 1/1981 | McLoughlin et al. | 222/55 X |
| 4,320,858 | 3/1982 | Mercer et al. | 222/146 HE |
| 4,392,366 | 7/1983 | Godfrey | 222/55 X |
| 4,406,247 | 9/1983 | Baughman et al. | 118/684 |
| 4,432,468 | 2/1984 | Siff et al. | 222/55 |
| 4,465,212 | 8/1984 | Boone | 222/504 |
| 4,522,059 | 6/1985 | Rodde et al. | 222/55 X |
| 4,584,964 | 4/1986 | Engel | 118/697 |
| 4,613,059 | 9/1986 | Merkel | 222/52 |
| 4,662,540 | 5/1987 | Schroter | 222/55 |
| 4,678,100 | 7/1987 | Gelinas et al. | 222/52 |
| 4,711,379 | 12/1987 | Price | 222/504 |
| 4,759,477 | 7/1988 | Gelinas et al. | 222/504 |
| 4,787,332 | 11/1988 | Geisel et al. | 118/692 |
| 4,842,162 | 6/1989 | Merkel | 222/1 |
| 4,852,773 | 8/1989 | Standlick et al. | 222/504 |
| 4,858,172 | 8/1989 | Stern | 364/160 |
| 4,955,507 | 9/1990 | Kirschner et al. | 222/59 X |
| 5,054,650 | 10/1991 | Price | 222/55 X |
| 5,065,695 | 11/1991 | Baron et al. | 222/52 X |
| 5,133,480 | 7/1992 | Matsumoto et al. | 222/399 X |

FOREIGN PATENT DOCUMENTS

| | | | |
|---|---|---|---|
| 468095 | 5/1975 | U.S.S.R. | 222/59 |
| 2212784 | 8/1989 | United Kingdom | 222/55 |

OTHER PUBLICATIONS

Thermal Instruments Co., Installation, Operation and Calibration Instructions for Thermal Flowmeter, Model 600.
Ashcroft Bulletin SW-10, B Series Switches, Jan. 1987.
VDO Mess-und Regeltechnik GmbH, I/P Signal Converter Operating Instructions.
ABB Kent Process Controller, Appendices 2-4, pp. 27-30.

Primary Examiner—Andres Kashnikow
Assistant Examiner—Kenneth DeRosa
Attorney, Agent, or Firm—Ronald A. Krasnow

[57] ABSTRACT

A method and apparatus for controlling the flow of adhesive onto a moving substrate is provided using a thermal flowmeter. It is particularly designed for the tobacco industry wherein the flow of adhesive onto a continuous ribbon of paper in forming the side seam on tobacco rods requires consistent, controlled flow independent of external factors.

13 Claims, 2 Drawing Sheets

METHOD AND APPARATUS FOR DISPENSING A CONSTANT CONTROLLED VOLUME OF ADHESIVE

BACKGROUND OF THE INVENTION

This invention relates to the control of adhesive flow through a nozzle. More particularly, this invention relates to controlling adhesive flow through a nozzle such that a consistent, continuously controlled volume of adhesive is dispensed on a moving substrate independent of other system and environmental parameters.

In the tobacco industry, smoking articles, such as cigarettes, are made by cut filler being air-formed into a continuous rod of tobacco on a travelling belt. The tobacco rod is then encircled by a continuous ribbon of paper which is glued and heat-sealed to form a side seam. The formed rod proceeds to a cutting machine or further processing machine. Within this rod making process, formation of a consistent high-quality side seam requires a consistent and continuous amount of glue or adhesive dispensed for heat-sealing. Cost-effective high speed cigarette production also demands controlling the amount of glue or adhesive to maintain quality control.

However, currently employed adhesive dispensing methods do not meet the rigorous standards of high speed production because they are dependant on external conditions. External conditions affecting the dispensing of adhesive include temperature changes, pressure changes, viscosity and dispensing nozzle wear. One common adhesive dispensing method is the use of head, i.e., the pressure of the adhesive as a fluid created by maintaining the adhesive in a reservoir elevated above the dispensing nozzle. This method is unsatisfactory because as the adhesive level in the reservoir goes down, the head goes down and so does the flow rate. As a result, some portions of the tobacco rod have more glue or adhesive than other portions of the same tobacco rod.

Adhesive dispensing is also controlled by maintaining constant adhesive pressure behind the dispensing nozzle. For example, U.S. Pat. No. 2,914,253 to Jobus et al. maintains nozzle back pressure through use of a recirculation loop. U.S. Pat. No. 4,842,162 to Merkel discloses an adhesive dispensing nozzle controlled in part by a flow sensor located at the nozzle. However, the flow rate sensor is in fact a pressure sensor located downstream of the needle control valve. See also U.S. Pat. No. 4,613,059 to Merkel.

In another alternative, U.S. Pat. No. 4,858,172 to Stern teaches use of a positive displacement pump to guarantee a constant flow rate of adhesive to a sealant gun. Stern also discloses a closed loop flow control using feedback from a flow meter used in place of the positive displacement pump to provide accurate steady state performance. But this disclosure is conditioned by an earlier statement that even placing a flow meter very near the output nozzle and forming a closed loop flow control does not satisfy control of flow independent from outside conditions such as temperature change and nozzle wear. U.S. Pat. No. 4,711,379 to Price teaches a related method of variable proportional flow of adhesive relative to a substrate speed using a torquemotor.

Also, U.S. Pat. No. 4,662,540 to Schroter teaches dispensing a high viscosity liquid using a flow detector to ensure constant flow. However, there the flow detector does not control the flow. Instead, a pressure detection system controls the flow.

While each of the above references teaches control of adhesive flow through various methods, none of them teach use of a flow meter which is not dependent on outside parameters such as temperature, pressure, viscosity or nozzle wear. This dependence presents a drawback in each prior method that is overcome by the present invention. Furthermore, the present invention provides a consistent controlled volume of adhesive at low flow rates, which is not contemplated by the cited disclosures.

SUMMARY OF THE INVENTION

To solve the problem of adhesive flow for tobacco rod making it is an object of this invention to provide a control system for adhesive flow.

It is another object of this invention to provide a continuous amount of adhesive flow through a dispensing nozzle.

It is a further object of this invention to provide a consistent amount of adhesive flow through a dispensing nozzle.

It is yet another object of this invention to control the flow of adhesive through a dispensing nozzle using a flow meter. Particularly, this object is the control of adhesive flow at the low flow rates useful in the tobacco industry.

In accordance with these objects, and others which will become apparent as the description continues, the invention provides a controlled consistent volume of adhesive, independent of external factors, through a dispensing nozzle by measuring the volume of adhesive flowing from a reservoir. A flow meter capable of measuring very small flow rates, without contributing to the total pressure drop of the system, is employed to measure adhesive flow. In operation, the flow meter sends a signal to adjust a valve stem in the dispensing nozzle to produce a constant flow rate through the nozzle. In a preferred embodiment, a thermal flowmeter capable of measuring very low flow rates is employed.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

This invention provides a method and apparatus for controlling the flow of adhesive onto a substrate. The preferred embodiments of the invention disclose an adhesive dispensing system. The preferred substrate described herein is a continuous ribbon of paper used to wrap a tobacco rod. However, it will be understood that any substrate can be used that moves continually past a dispensing nozzle used for dispensing an adhesive.

Figure 1:
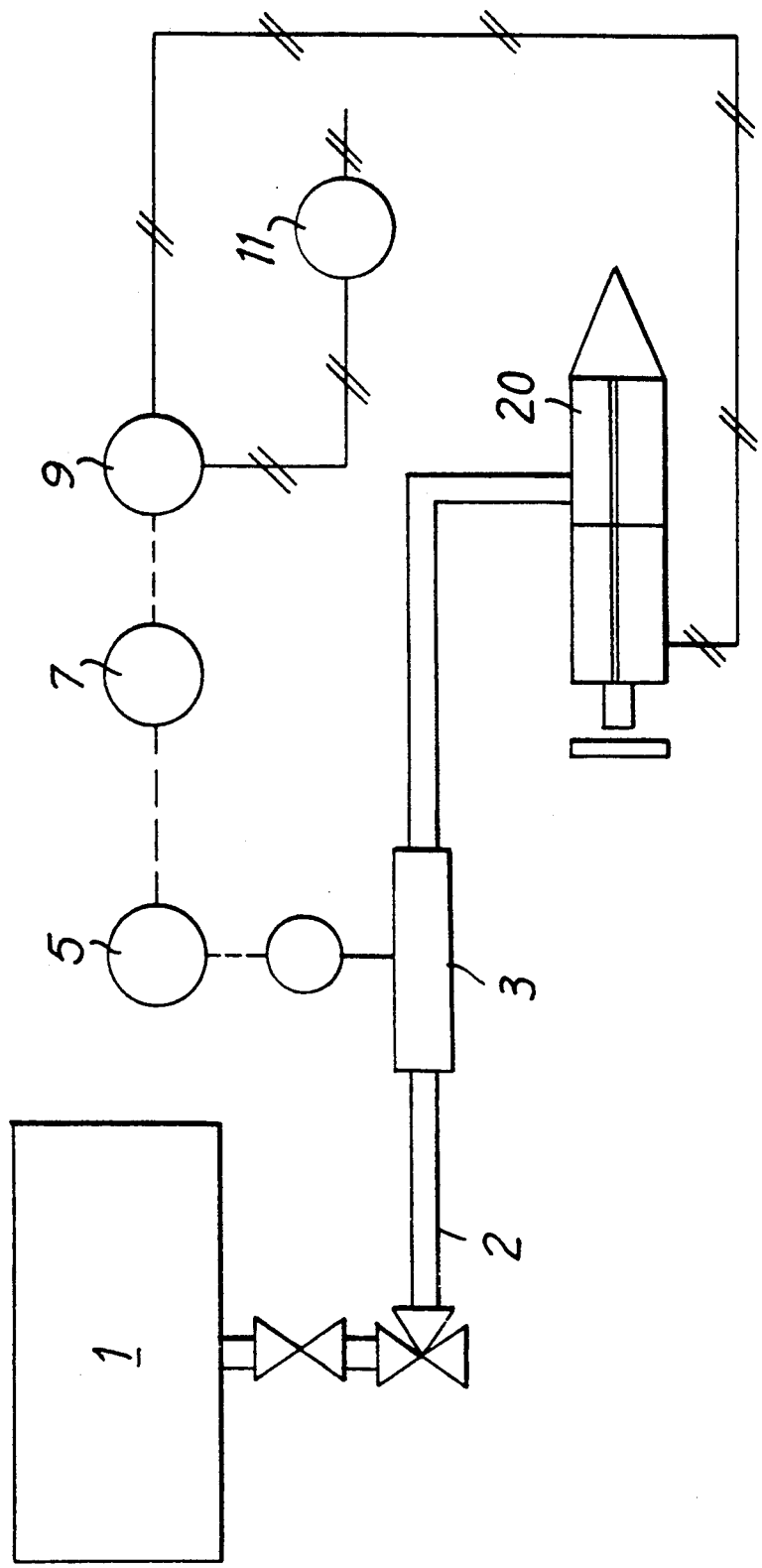
FIG. 1 is a schematic of the control system of the present invention.

Looking at FIG. 1, there is shown the overall schematic for the present invention. Adhesive or glue to form the side seam of a tobacco rod flows from a reservoir 1 past a flow element 3 to a dispensing nozzle 20 by way of a flow line 2. The flow of adhesive can be by any means, but preferably is by gravity. The flow element 3 provides an electrical signal proportional to the adhesive flow. This proportional signal is sent to a flow transmitter 5 which converts the proportional signal into standard control units thereby converting the signal into a standardized proportional signal.

The standardized proportional signal is sent to a process controller 7. The process controller 7 compares the standardized proportional signal to a predetermined set point. Based on the comparison, the process controller 7 outputs a standardized control signal towards the dispensing nozzle 20. Before reaching the dispensing nozzle, the standardized control signal is converted into a pneumatic control signal by a signal converter 9. The signal is now a pressure which is sent to a pressure chamber in the dispensing nozzle 20. Using an existing pressure sensitive diaphragm connected to a needle valve in the dispensing nozzle, the correct volume of adhesive flow is dispensed in accordance with the flow element. No external conditions can effect the flow of adhesive because flow is dependant only on the flow element. Optionally, a pressure switch 11 is included to allow for further control, either manually or by other control elements which are not shown, but will be apparent to one of ordinary skill in the art.

The nature of the flow element 3 of the present invention is that it must measure extremely small flow rates. Specifically, flows in the range of from about 0.1 milliliters (ml) per minute to about 40 ml per minute must be measured. In a preferred embodiment, the flow element 3 will not contribute to the overall pressure drop of the adhesive distribution system. Any flow element known in the art meeting these requirements can be employed.

The preferred flow element embodiment uses thermal mass flow principles for sensing the primary flow of adhesive, i.e., a thermal flow meter. In thermal flow meters, heat in measured amounts is added to the flowing stream of adhesive upstream of the measurement. The cooling effect (heat dissipation) of the flowing stream becomes the measure of flow. Either the temperature rise of the adhesive or the amount of energy required to maintain a heated element at a constant temperature can be measured. The heat difference or amount of energy measured is transformed into the signal that is transmitted from the flow element. The signal is therefore proportional to the flow rate of the adhesive independent of external conditions such as temperature, pressure, viscosity, nozzle wear or other dispensing system pressure affecting conditions.

The flow transmitter 5 receives the signal from the flow element 3. Using the known physical properties of the adhesive, standard heat transfer and heat capacity principles, and standard flow principles the flow transmitter converts the signal into a proportional signal. Further, the flow transmitter standardizes the proportional signal into standard control units. Standard control units can be in the range of from 0 to about 20 milliamps D.C. or in the range of from 1 volt D.C. (VDC) to about 5 VDC or any other standardized control units. In the most preferred embodiment, a flow transmitter manufactured by Thermal Instrument Co., model number 600 is employed. This model is a combination of the flow meter and transmitter as a matched set.

The standardized proportional signal is sent to the process controller 7 from the signal transmitter 5. The process controller 7 can be any controller which is capable of comparing the inputted standardized proportional signal to a set point and outputting a signal to control the flow of adhesive, should a change in flow be necessary. The process controller 7, uses an internal or external predetermined set point for comparison to the inputted standardized proportional signal for determining how the output control signal should differ in relation to the inputted signal. Note that the controller can be either digital or analog. In a preferred embodiment, the process controller 7 employs a microcomputer.

The preferred embodiment employs a proportional plus integral plus derivative (PID) controller. A PI controller provides automatic control action wherein the outputted signal is in a continuous linear relationship with the combination of the standardized proportional signal, the time integral of the standardized proportional signal and the time rate of change of the standardized proportional signal. Thus, the outputted signal reflects not only the inputted signal, but it can anticipate changes to the inputted signal and can change more quickly than the input signal. In the most preferred embodiment, a controller manufactured ABB Kent, Model P96M is employed.

The standardized control signal outputted by the process controller 7 is sent to a signal converter 9 which converts the electronic signal into a pressure signal. This pressure signal is preferably sent two places.

Figure 2:
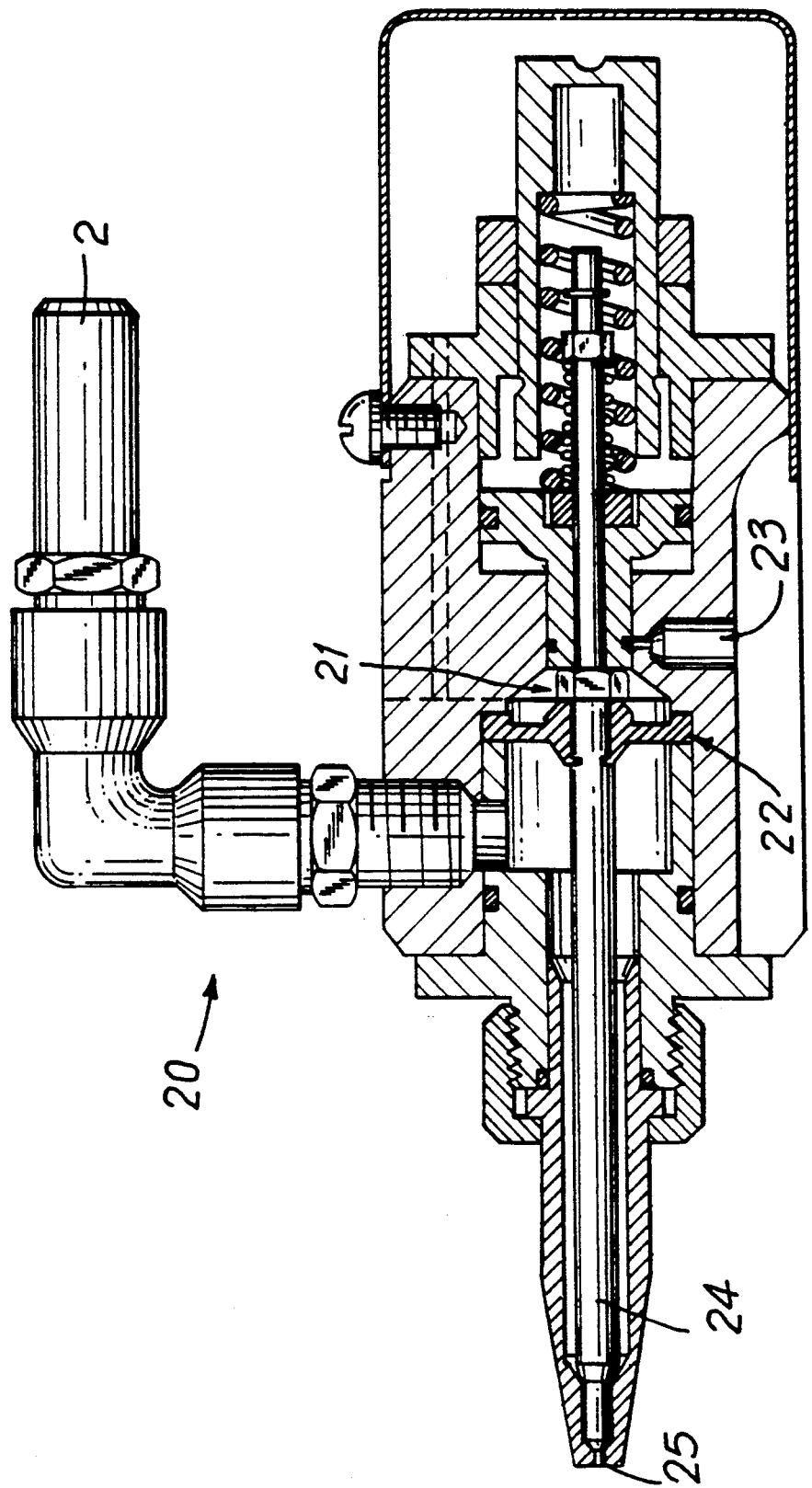
FIG. 2 shows in detail the dispensing nozzle.

First, the pressure signal can be sent to the dispensing nozzle 20. As shown in FIG. 2, the dispensing nozzle 20 has a pressure chamber 21 that typically comprises a sealed chamber with a diaphragm 22 comprising one of the walls of the chamber. As the pressure signal from the signal converter 9 changes, the diaphragm moves back and forth. The pressure signal enters the dispensing nozzle as control air at 23. Attached to the diaphragm 22 is the valve stem of the needle valve 24 which moves in and out with the diaphragm as the pressure signal changes. The needle valve 24 changes the flow of adhesive by controlling the opening 25 in the dispensing nozzle in accordance with the movements of the diaphragm. Thus, the process controller 7, controls the flow of adhesive by its output signal. For another embodiment see U.S. Pat. No. 4,465,212 to Boone wherein a piston is used in place of a diaphragm.

The needle valve of the dispensing nozzle 20 controls the flow of adhesive out of the dispensing nozzle. The adhesive leaves the dispensing nozzle and is dispensed onto a substrate moving past the nozzle. The preferred substrate is the paper used to wrap a tobacco rod.

The second place that the output signal of the process controller can go is to a pressure switch 11. This pressure switch provides additional control by producing or receiving an additional signal that can be used for various purposes. In a preferred embodiment, the pressure switch provides an immediate stop capability when the substrate stops moving, such as when the rod making machine stops. Other embodiments envisioned include a programmed override of the signal from the signal converter during start up or other nonsteady state operations, as well as other signaling sent back to the rod making machine. In a most preferred embodiment, a Dresser Industries/Ashcroft pressure switch, Model B4 is employed.

It will be recognized by one of skill in the art that the above described process can be modified to include valves or other process equipment which will not affect the invention. Further, it will be understood that the foregoing is merely illustrative of the principles on this invention. Modifications by those skilled in the art, without departing from the spirit and scope of the invention, will be apparent. The present invention is limited only by the claims which follow.

What is claimed is:

1. A method for controlling the flow of adhesive, comprising the steps of providing a reservoir of adhesive connected to a dispensing nozzle by way of a flow line, measuring a flow of adhesive in the flow line in the range of from about 0.1 milliliters per minute to about 40 milliliters per minute and producing a first signal proportional to the measured flow, comparing the first signal to a predetermined set point, producing a second signal reflecting the difference between the first signal and the predetermined set point, sending the second signal to the dispensing nozzle, and adjusting the flow of adhesive to meet the predetermined set point.

2. The method of claim 1, further comprising the step of dispensing the adhesive onto a substrate moving past the dispensing nozzle.

3. The method of claim 1 wherein the flow controller is responsive only to the flow element.

4. A method for dispensing adhesive, comprising the steps of providing a reservoir of adhesive connected to a dispensing nozzle by way of a flow line, measuring the flow of adhesive in the flow line and producing a first signal proportional to the measured flow, comparing the first signal to a predetermined step point, producing a second signal reflecting the difference between the first signal and the predetermined set point, sending the second signal to the dispensing nozzle, adjusting the flow of adhesive to meet the predetermined set point, and dispensing a constant amount of through the dispensing nozzle onto a continuous substrate moving past the dispensing nozzle.

5. The method of claim 4, further comprising a flow element, employed in the measuring step, that is capable of measuring flows of adhesive in the range of from about 0.1 milliliter per minute to about 40 milliliters per minute.

6. The method of claim 5, wherein the flow element is a thermal flow meter.

7. An apparatus for controlling the flow of adhesive, comprising a reservoir of adhesive connected to a dispensing nozzle by a flow line, a flow element located in the flow line between the reservoir and dispensing nozzle, the flow element being a thermal flow meter capable of measuring flows of adhesive in the range of from about 0.1 milliliters per minute to about 40 milliliters per minute, a flow transmitter in communication with the flow element, a flow controller in communication with the flow transmitter, and the flow controller also being in communication with the dispensing nozzle, wherein the flow of adhesive is controlled by adjusting the flow responsive to a signal sent by the flow element that is compared to a predetermined set point.

8. The apparatus of claim 7, further comprising a pressure switch in communication with the signal converter.

9. The apparatus of claim 8, wherein the pressure switch is also in communication with a tobacco rod making machine.

10. The apparatus of claim 7, further comprising a signal converter in communication with the flow controller and the dispensing nozzle, wherein the signal converter converts the signal from the flow controller into a signal recognizable by the dispensing nozzle.

11. The apparatus of claim 10, further comprising a needle valve inside the dispensing nozzle, wherein, responsive to the signal sent from signal converter, the needle valve is moved to control the amount of adhesive flowing through the dispensing nozzle.

12. The apparatus of claim 7, wherein the flow is controlled by adjusting the flow through the dispensing nozzle.

13. An apparatus for controlling the flow of adhesive, comprising:
   a reservoir connected to a nozzle by a flow line;
   a flow element located in said flow line between said reservoir and nozzle, said flow element being a thermal flow meter capable of measuring flow in the range of from about 0.1 milliliters per minute to about 40 milliliters per minute;
   a flow transmitter in communication with said flow element;
   a flow controller in communication with said flow transmitter, and said flow controller also being in communication with said nozzle; and
   a needle valve inside said nozzle;
   wherein said flow transmitter sends a first signal to said flow controller from said flow element, said flow controller compares said first signal to a predetermined set point and sends a second signal to said nozzle and responsive to said second signal said needle valve in said nozzle is opened or closed to control the flow of adhesive.

* * * * *

UNITED STATES PATENT AND TRADEMARK OFFICE
CERTIFICATE OF CORRECTION

PATENT NO. : 5,263,608
DATED : November 23, 1993
INVENTOR(S) : Bernard C. Kiernan et al.

It is certified that error appears in the above-indentified patent and that said Letters Patent is hereby corrected as shown below:

Column 5, line 32, after "amount of" insert --the adhesive--.

Signed and Sealed this

Sixth Day of September, 1994

Attest:

BRUCE LEHMAN

Attesting Officer

Commissioner of Patents and Trademarks